United States Patent
Sugano (10) Patent No.: US 12,427,977 B2
(45) Date of Patent: Sep. 30, 2025

(54) TRAVEL CONTROLLER AND METHOD FOR TRAVEL CONTROL

(71) Applicant: TOYOTA JIDOSHA KABUSHIKI KAISHA, Toyota (JP)

(72) Inventor: Tatsuya Sugano, Sunto-gun Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 263 days.

(21) Appl. No.: 18/375,580

(22) Filed: Oct. 2, 2023

(65) Prior Publication Data

US 2024/0123977 A1  Apr. 18, 2024

(30) Foreign Application Priority Data

Oct. 18, 2022  (JP) .................................. 2022-166873

(51) Int. Cl.
| | |
|---|---|
| *B60W 30/09* | (2012.01) |
| *B60W 30/06* | (2006.01) |
| *B60W 30/095* | (2012.01) |
| *B60W 30/14* | (2006.01) |

(52) U.S. Cl.
CPC ............ *B60W 30/09* (2013.01); *B60W 30/06* (2013.01); *B60W 30/0956* (2013.01); *B60W 30/146* (2013.01); *B60W 2554/4041* (2020.02); *B60W 2554/80* (2020.02); *B60W 2556/50* (2020.02)

(58) Field of Classification Search
CPC .. B60W 30/06; B60W 30/09; B60W 30/0956; B60W 30/146
See application file for complete search history.

(56) References Cited

U.S. PATENT DOCUMENTS

| | | | |
|---|---|---|---|
| 2019/0232953 A1 | 8/2019 | Suzuki et al. | |
| 2020/0391756 A1* | 12/2020 | Wang | B60W 10/04 |
| 2021/0009115 A1* | 1/2021 | Ohmura | B60T 8/92 |
| 2021/0065549 A1 | 3/2021 | Kimura | |
| 2021/0316718 A1 | 10/2021 | Sugano | |

(Continued)

FOREIGN PATENT DOCUMENTS

| | | | | |
|---|---|---|---|---|
| CN | 109017757 A | * | 12/2018 | ............ B60W 30/00 |
| JP | 2021-039023 A | | 3/2021 | |

(Continued)

OTHER PUBLICATIONS

English Translation of CN 109017757 A (Year: 2018).*

*Primary Examiner* — Anshul Sood
(74) *Attorney, Agent, or Firm* — Dinsmore & Shohl LLP (57) ABSTRACT

A travel controller executes travel control of a vehicle including collision avoidance control, based on environmental information including control information received from a control device and environmental data outputted from an environmental sensor mounted on the vehicle, each indicating conditions around the vehicle. The travel controller regulates the speed of the vehicle when a delay time in receiving the control information exceeds a delay threshold. The travel controller sets the delay threshold to a first threshold when an estimated avoidance difficulty from the environmental information is less than a difficulty threshold; and sets the delay threshold to a second threshold less than the first threshold when the estimated avoidance difficulty is greater than the difficulty threshold.

9 Claims, 5 Drawing Sheets

(56) References Cited

U.S. PATENT DOCUMENTS

2022/0135025 A1    5/2022   Hidaka
2022/0242447 A1    8/2022   Nagura et al.

FOREIGN PATENT DOCUMENTS

| JP | 2021-068132 A | 4/2021 |
| JP | 2021-166018 A | 10/2021 |
| WO | 2018/066069 A1 | 4/2018 |
| WO | 2021/020297 A1 | 2/2021 |

* cited by examiner

TRAVEL CONTROLLER AND METHOD FOR TRAVEL CONTROL

CROSS-REFERENCE TO RELATED APPLICATION

This application claims priority to Japanese Patent Application No. 2022-166873 filed on Oct. 18, 2022, the entire contents of which are herein incorporated by reference.

FIELD

The present disclosure relates to a travel controller and a method for controlling travel of a vehicle.

BACKGROUND

A known automated valet parking system executes automated driving control of a vehicle between a predetermined place and a parking space in a parking area.

Japanese Unexamined Patent Publication No. 2021-166018 describes an automated valet parking system that notifies the occurrence of an anomaly to a user of a vehicle if a braking distance at execution of braking control for stopping the vehicle in a parking space is outside a tolerable range. The automated valet parking system can sense the completion of parking of the vehicle, using a sensor installed in the parking area.

SUMMARY

An automated valet parking system may include a control device that generates control information indicating conditions around vehicles traveling in a parking area, using output data of a facility sensor indicating conditions of the parking area, and that transmits the control information to the vehicles. An automated valet parking system with such a control device can control travel of a vehicle to avoid a collision with an object, such as a pedestrian or another vehicle. However, a delay in communication between the control device and a vehicle may result in the automated valet parking system failing to carry out appropriate travel control of the vehicle so as to avoid collision of the vehicle with an object.

It is an object of the present disclosure to provide a travel controller that can appropriately control travel of a vehicle in a parking area managed by an automated valet parking system.

The following is a summary of the present disclosure.

(1) A travel controller comprising a processor configured to:
   execute travel control of a vehicle, based on environmental information, wherein the environmental information includes control information received from a control device via a communication network and environmental data outputted from an environmental sensor mounted on the vehicle, the control information and the environmental data indicate conditions around the vehicle, and the travel control includes collision avoidance control for avoiding a collision of the vehicle with an object in a vicinity of the vehicle;
   decelerate the vehicle or change an upper-limit speed of the vehicle from a first speed to a second speed less than the first speed when a delay time in receiving the control information exceeds a delay threshold;
   estimate, from the environmental information, avoidance difficulty indicating a degree of difficulty in avoiding a collision with the object by the collision avoidance control for a case where the object is detected in the conditions around the vehicle indicated by the environmental information; and
   set the delay threshold to a first threshold when the estimated avoidance difficulty is less than a difficulty threshold; and set the delay threshold to a second threshold less than the first threshold when the estimated avoidance difficulty is greater than the difficulty threshold.

(2) The travel controller according to above item (1), wherein in the estimation, the processor estimates the avoidance difficulty at a greater degree as a vehicle path where the vehicle exists is narrower.

(3) The travel controller according to above item (2), wherein in the estimation, the processor identifies the width of the vehicle path, based on information indicating the width of the vehicle path included in the control information of the environmental information.

(4) The travel controller according to any one of above items (1)-(3), wherein in the estimation, the processor estimates the avoidance difficulty at a greater degree as a distance to an object in the vicinity of the vehicle is shorter.

(5) The travel controller according to above item (4), wherein in the estimation, the processor identifies the distance to the object in the vicinity of the vehicle, based on information indicating a position of the object included in the control information of the environmental information.

(6) The travel controller according to any one of above items (1)-(5), wherein in the estimation, the processor estimates the avoidance difficulty at a greater degree as a ratio of a blind spot that is not represented in the environmental data at a current position of the vehicle to an area around the vehicle corresponding to the environmental data is higher.

(7) The travel controller according to any one of above items (1)-(6), wherein in the estimation, the processor estimates the avoidance difficulty at a greater degree as a distance to a blind spot that is not represented in the environmental data at a current position of the vehicle in an area around the vehicle corresponding to the environmental data is shorter.

(8) A method for travel control having a travel controller that controls travel of a vehicle execute a process comprising:
   executing travel control of the vehicle, based on environmental information, wherein the environmental information includes control information received from a control device via a communication network and environmental data outputted from an environmental sensor mounted on the vehicle, the control information and the environmental data indicate conditions around the vehicle, and the travel control includes collision avoidance control for avoiding a collision of the vehicle with an object in a vicinity of the vehicle;
   decelerating the vehicle or changing an upper-limit speed of the vehicle from a first speed to a second speed less than the first speed when a delay time in receiving the control information exceeds a delay threshold;
   estimating, from the environmental information, avoidance difficulty indicating a degree of difficulty in avoiding a collision by the collision avoidance control for a case where the object is detected in the conditions around the vehicle indicated by the environmental information; and
   setting the delay threshold to a first threshold when the estimated avoidance difficulty is less than a difficulty threshold; and setting the delay threshold to a second threshold less than the first threshold when the avoidance difficulty is greater than the difficulty threshold.

(9) A non-transitory computer-readable medium storing a computer program for travel control, the computer program causing a computer mounted on a vehicle to execute a process including:

executing travel control of the vehicle, based on environmental information, wherein the environmental information includes control information received from a control device via a communication network and environmental data outputted from an environmental sensor mounted on the vehicle, the control information and the environmental data indicate conditions around the vehicle, and the travel control includes collision avoidance control for avoiding a collision of the vehicle with an object in a vicinity of the vehicle;

decelerating the vehicle or changing an upper-limit speed of the vehicle from a first speed to a second speed less than the first speed when a delay time in receiving the control information exceeds a delay threshold;

estimating, from the environmental information, avoidance difficulty indicating a degree of difficulty in avoiding a collision by the collision avoidance control for a case where the object is detected in the conditions around the vehicle indicated by the environmental information; and setting the delay threshold to a first threshold when the estimated avoidance difficulty is less than a difficulty threshold; and setting the delay threshold to a second threshold less than the first threshold when the avoidance difficulty is greater than the difficulty threshold.

The travel controller according to the present disclosure can appropriately control travel of a vehicle in a parking area managed by an automated valet parking system.

DESCRIPTION OF EMBODIMENTS

A travel controller that can appropriately control travel of a vehicle in a parking area managed by an automated valet parking system will now be described with reference to the attached drawings. The travel controller executes travel control of a vehicle, based on environmental information including control information and environmental data. The control information is received from a control device via a communication network and indicates conditions around the vehicle. The environmental data is outputted from an environmental sensor mounted on the vehicle and indicates conditions around the vehicle. The travel control executed by the travel controller includes collision avoidance control for avoiding a collision of the vehicle with an object in the vicinity of the vehicle. The travel controller decelerates the vehicle or changes an upper-limit speed of the vehicle from a first speed to a second speed less than the first speed when a delay time in receiving the control information exceeds a delay threshold. From the environmental information, the travel controller estimates avoidance difficulty, which indicates the degree of difficulty in avoiding a collision with the object by the collision avoidance control for the case where the object is detected in the conditions around the vehicle indicated by the environmental information. When the estimated avoidance difficulty is less than a difficulty threshold, the travel controller sets the delay threshold to a first threshold. When the estimated avoidance difficulty is greater than the difficulty threshold, the travel controller sets the delay threshold to a second threshold less than the first threshold.

Figure 1:
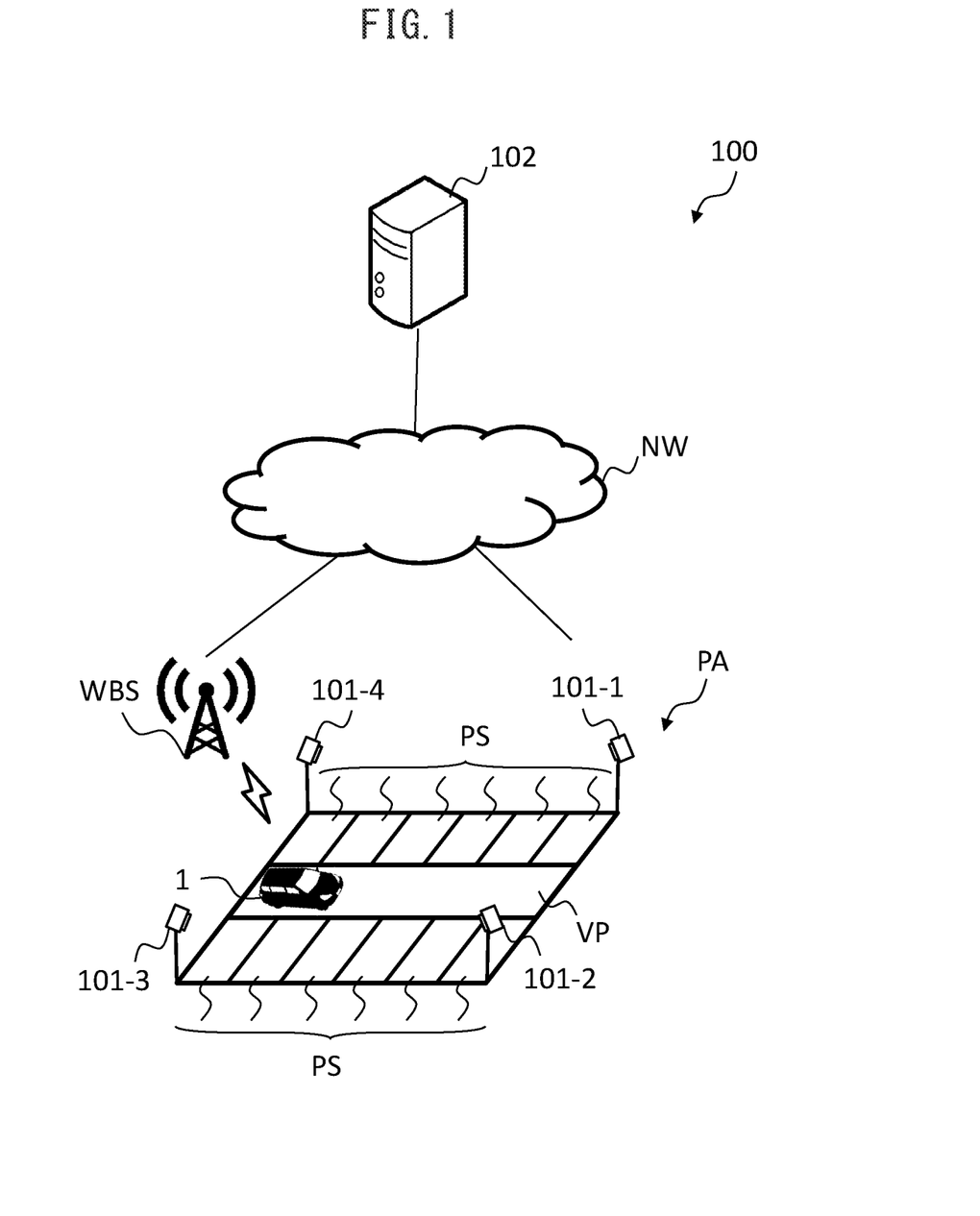
FIG. 1 schematically illustrates the configuration of an automated valet parking system.

FIG. 1 schematically illustrates the configuration of an automated valet parking system. The automated valet parking system 100 includes facility sensors 101-1 to 101-4 (hereafter collectively referred to as "facility sensors 101") installed in a parking area PA, a control device 102, and a vehicle compatible with the automated valet parking system (hereafter a "vehicle 1"). The vehicle 1 includes a travel controller according to the present disclosure, and can travel at least in the parking area PA without a driver's driving operation, based on control information transmitted by the control device 102.

The parking area PA includes a vehicle path VP where the vehicle 1 can travel, and parking spaces PS that border on the vehicle path VP and where the vehicle 1 can be parked. The facility sensors 101 are communicably connected to the control device 102 via a communication network NW. The vehicle 1 accesses a wireless base station WBS, which is connected to the communication network NW, for example, via a gateway (not illustrated), thereby communicably connecting to the control device 102 via the wireless base station WBS and the communication network NW.

The automated valet parking system 100 may include another vehicle compatible with the automated valet parking system, besides the vehicle 1. In the automated valet parking system 100, the communication network NW may be connected with multiple wireless base stations WBS.

Each facility sensor 101 is, for example, a camera including a two-dimensional detector constructed from an array of optoelectronic transducers, such as CCD or C-MOS, having sensitivity to visible light and a focusing optical system that forms an image of a target region on the two-dimensional detector. The facility sensors 101 output facility images representing the parking area PA as facility data, and transmit the facility images to the control device 102 via the communication network NW. In the automated valet parking system 100, the number of facility sensors 101 is not limited to four, and may be less than four (e.g., one) or greater than four (e.g., 100). The facility sensors 101 may be connected to the communication network via a relay device (not illustrated). The facility sensors 101 need not be fixed in the parking area PA, and may be mounted, for example, facing downward on drones flying above the vehicle 1.

The control device 102 is a computer including a communication interface, a memory, and a processor. The control device 102 inputs facility data received via the communication network NW and the communication interface into a classifier that has been trained to identify an object region representing an object, such as a pedestrian or a vehicle, thereby detecting an object region representing an object and the type of the represented object from the facility data.

The classifier may be, for example, a convolutional neural network (CNN) including convolution layers connected in series from the input side toward the output side, such as You Only Look Once (YOLO) or Single Shot MultiBox Detector (SSD). A CNN that has been trained using a large number of inputted images representing objects to be detected, such as pedestrians and vehicles, as training data operates as a classifier that detects an object and that outputs an object region representing the object in the image and the type of the object.

Regarding the parking area PA, the memory of the control device 102 stores the positions and sizes of the vehicle path VP and the parking spaces PS, the focal length and the direction of the optical axis of the focusing optical system of each facility sensor 101, and the position where each facility sensor is installed. When an object region corresponding to an object is detected from facility data of multiple facility sensors, the control device 102 estimates the distances from the facility sensors to the object by triangulation and estimates the real-space position of the detected object. When multiple object regions are detected from facility data of each of the facility sensors, the control device 102 may determine, for example, object regions of the same detected type as those corresponding to the same object and estimate the distances to the object and its real-space position. The control device 102 may identify object regions corresponding to the same object in pieces of facility data, using optical flow of object regions represented in the pieces of facility data.

The control information includes route information indicating a route to be traveled by the vehicle 1 in the parking area PA. The control device 102 generates route information indicating, for example, a route from an entrance of the parking area PA through the vehicle path VP to an identified one of the parking spaces PS. The control device 102 may generate route information indicating a route from a parking space where the vehicle 1 is parked among the parking spaces PS through the vehicle path VP to an exit of the parking area PA.

The control device 102 transmits object information indicating the position of an object detected from facility data to the vehicle 1 traveling in the parking area PA as control information indicating conditions around the vehicle 1. The control device 102 also transmits time information indicating the current time and parking area information on the parking area PA, including the positions and sizes of the vehicle path VP and the parking spaces PS, as control information. When the distance between the vehicle 1 and the object is less than a predetermined distance threshold, the control device 102 transmits a collision avoidance signal for causing the vehicle 1 to execute collision avoidance control, as control information.

Figure 2:
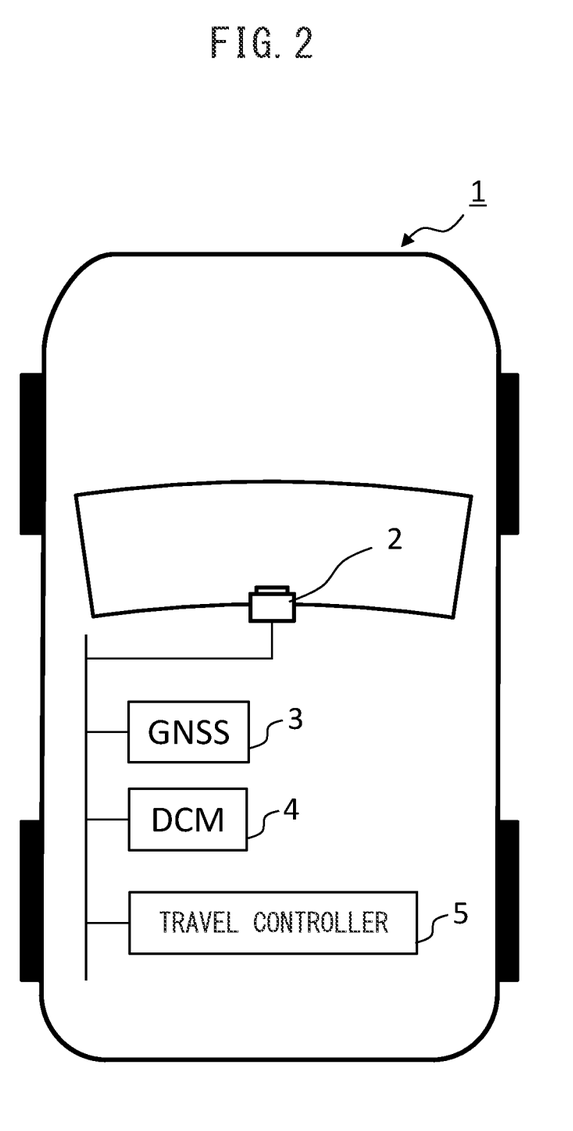
FIG. 2 schematically illustrates the configuration of a vehicle equipped with a travel controller.

FIG. 2 schematically illustrates the configuration of the vehicle 1 equipped with a travel controller.

The vehicle 1 includes an environmental camera 2, a global navigation satellite system (GNSS) receiver 3, a data communication module (DCM) 4, and a travel controller 5. The environmental camera 2, the GNSS receiver 3, and the data communication module 4 are communicably connected to the travel controller 5 via an in-vehicle network conforming to a standard such as a controller area network.

The environmental camera 2 is an example of the environmental sensor for generating environmental data indicating conditions around the vehicle 1. The environmental camera 2 includes a two-dimensional detector constructed from an array of optoelectronic transducers, such as CCD or C-MOS, having sensitivity to visible light and a focusing optical system that forms an image of a target region on the two-dimensional detector. The environmental camera 2 is disposed, for example, in a front and upper area in the vehicle interior so as to face forward. The environmental camera 2 takes a picture of the surroundings of the vehicle 1 through a windshield every predetermined capturing period (e.g., 1/30 to 1/10 seconds), and outputs environmental images representing the surroundings as environmental data. As the environmental sensor, the vehicle 1 may include a sensor other than the environmental camera 2, e.g., a light detection and ranging (LiDAR) sensor that generates a range image, whose pixels each have a value depending on the distance to an object represented in the pixel, based on conditions around the vehicle 1, as environmental data.

The GNSS receiver 3 receives GNSS signals from GNSS satellites every predetermined period, and determines the position of the vehicle 1, based on the received GNSS signals. The GNSS receiver 3 outputs a positioning signal indicating the result of determination of the position of the vehicle 1 based on the GNSS signals to the travel controller 5 via the in-vehicle network every predetermined period. Further, the GNSS receiver 3 detects the current time from time information included in the GNSS signals.

The data communication module 4, which is an example of a vehicle communication unit, is a device to execute a wireless communication process conforming to a predetermined wireless communication standard, such as "4G (4th Generation)" or "5G (5th Generation)." The data communication module 4 includes data received from the travel controller 5 in an uplink radio signal, and transmits the radio signal to a data communication module included in the control device 102. Further, the data communication module 4 passes data included in a radio signal received from the data communication module included in the control device 102 to the travel controller 5. The data communication module 4 may be mounted as part of the travel controller 5.

The travel controller 5 controls travel of the vehicle 1, using control information received from the control device 102 via the data communication module 4 and environmental data outputted from the environmental camera 2.

Figure 3:
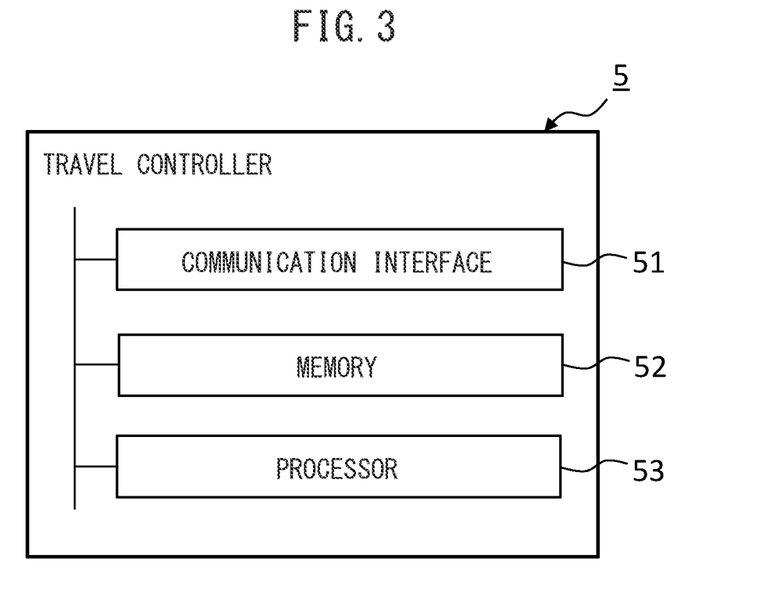
FIG. 3 schematically illustrates the hardware of the travel controller.

FIG. 3 schematically illustrates the hardware of the travel controller 5. The travel controller 5 includes a communication interface 51, a memory 52, and a processor 53.

The communication interface 51, which is an example of a communication unit, includes a communication interface circuit for connecting the travel controller 5 to the in-vehicle network. The communication interface 51 provides received data for the processor 53, and outputs data provided from the processor 53 to an external device.

The memory 52 includes volatile and nonvolatile semiconductor memories. The memory 52 stores various types of data used for processing by the processor 53, such as first and second speeds to be set as an upper-limit speed of the vehicle 1 and first and second thresholds to be set as a delay threshold for determining the necessity of a change of the upper-limit speed. The memory 52 also stores various application programs, such as a travel control program for executing a travel control process.

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 4:
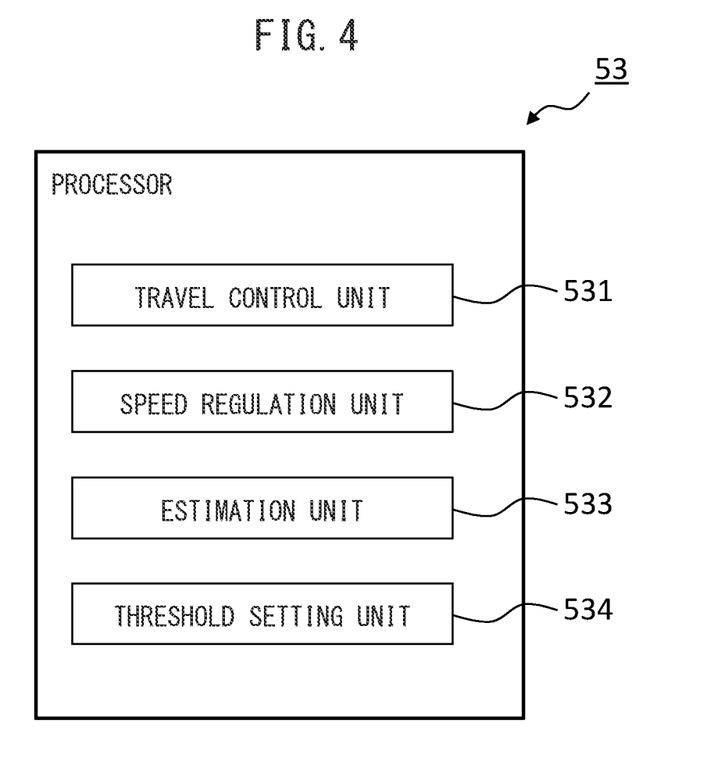
FIG. 4 is a functional block diagram of a processor included in the travel controller.

FIG. 4 is a functional block diagram of the processor 53 included in the travel controller 5.

As its functional blocks, the processor 53 of the travel controller 5 includes a travel control unit 531, a speed regulation unit 532, an estimation unit 533, and a threshold setting unit 534. These units included in the processor 53 are functional modules implemented by a computer program executed by the processor 53. The computer program for achieving the functions of the units of the processor 53 may be provided in a form recorded on a computer-readable portable storage medium, such as a semiconductor memory, a magnetic medium, or an optical medium. Alternatively, the units included in the processor 53 may be implemented in the travel controller 5 as separate integrated circuits, microprocessors, or firmware.

The travel control unit 531 executes travel control of the vehicle 1, using control information received from the control device 102 via the data communication module 4 and environmental data outputted from the environmental camera 2.

The travel control unit 531 outputs a control signal to a travel mechanism (not illustrated) of the vehicle 1 via the communication interface 51 so that the vehicle 1 travels at a speed not greater than an upper-limit speed stored in the memory 52 along a route indicated by route information included in the control information. Setting of the upper-limit speed will be described below. The travel mechanism includes, for example, a power source for powering the vehicle 1, such as an engine or a motor, and brakes for decelerating the vehicle 1.

The travel control unit 531 inputs the environmental data into a classifier that has been trained to identify an object as well as vehicle path boundaries and parking space boundaries, which are the edges of the vehicle path VP and the parking spaces PS in the parking area PA, respectively, thereby detecting an object, vehicle path boundaries, and parking space boundaries from the environmental data. The vehicle path boundaries include lines dividing the vehicle path VP and the parking spaces PS, as well as obstacles on the edges of the vehicle path VP, such as walls, sidewalks, and poles. The parking space boundaries include lines dividing the parking spaces PS, as well as obstacles on the edges of the parking spaces PS, such as walls, sidewalks, and poles.

The classifier may be, for example, a CNN including convolution layers connected in series from the input side toward the output side. A CNN that has been trained using a large number of inputted images representing objects to be detected, such as pedestrians and vehicles, and dividing lines as training data operates as a classifier that detects an object and that outputs an object region representing the object or a dividing line in the image. Alternatively, a machine learning algorithm, such as a support vector machine (SVM) or AdaBoost, may be used for the classifier. In the case where the classifier is an SVM, the SVM is trained to determine support vectors for identifying whether a predetermined object or a dividing line is included regarding various regions in environmental data, and thereby operates as a classifier that detects a predetermined object or a dividing line.

The travel control unit 531 identifies the position of the detected object in the world coordinate system. For example, the travel control unit 531 executes viewpoint transformation of the received environmental data, using information such as the mounted position of the environmental camera 2 on the vehicle 1, thereby generating an aerial image. The information such as the mounted position of the environmental camera 2 on the vehicle 1 may be prestored in the memory 52. Further, the travel control unit 531 estimates the position and direction of the vehicle 1 by matching the positions of dividing lines indicated by parking area information included in the control information with those of dividing lines in the generated aerial image. The travel control unit 531 identifies the position of the object represented in the generated aerial image, based on the estimated position and direction of the vehicle 1.

The travel control unit 531 controls travel of the vehicle so that the distance to the object detected from the environmental data is greater than a predetermined interval threshold. In some embodiments, the interval threshold is less than the distance threshold for the control device 102 to determine whether to transmit a collision avoidance signal.

The travel control unit 531 executes collision avoidance control for avoiding a collision of the vehicle 1 with an object in the vicinity of the vehicle 1, when a collision avoidance signal is received from the control device 102 as control information or when the distance to an object detected from environmental data falls below the interval threshold. The collision avoidance control is to output a control signal to the travel mechanism (not illustrated) of the vehicle 1 for actions of the vehicle 1 including deceleration, a stop, and steering in a direction away from the object.

The speed regulation unit 532 determines whether a delay time in receiving the control information exceeds a delay threshold. The speed regulation unit 532 compares time information included in control information received from the control device 102 via the communication interface with the current time obtained from the GNSS receiver 3 to detect the delay time in receiving the control information. Setting of the delay threshold will be described below.

When the delay time in receiving the control information does not exceed the delay threshold, the speed regulation unit 532 does not change travel control related to the vehicle speed that has been executed so far. When the delay time in receiving the control information exceeds the delay threshold, the speed regulation unit 532 outputs a control signal to the travel mechanism of the vehicle 1 via the communication interface 51 to decelerate the vehicle 1. When the delay time in receiving the control information exceeds the delay threshold, the speed regulation unit 532 may change the upper-limit speed of the vehicle 1 stored in the memory 52 from a first speed to a second speed less than the first speed, instead of or in addition to deceleration of the vehicle 1.

The estimation unit 533 estimates avoidance difficulty from environmental information including control information received from the control device 102 and environmental data outputted from the environmental camera 2. The avoidance difficulty is a value indicating the degree of difficulty in avoiding a collision with the object by the collision avoidance control for the case where the object is detected in the conditions around the vehicle 1 indicated by the environmental information. Greater avoidance difficulty indicates that collision avoidance is more difficult.

Figure 5:
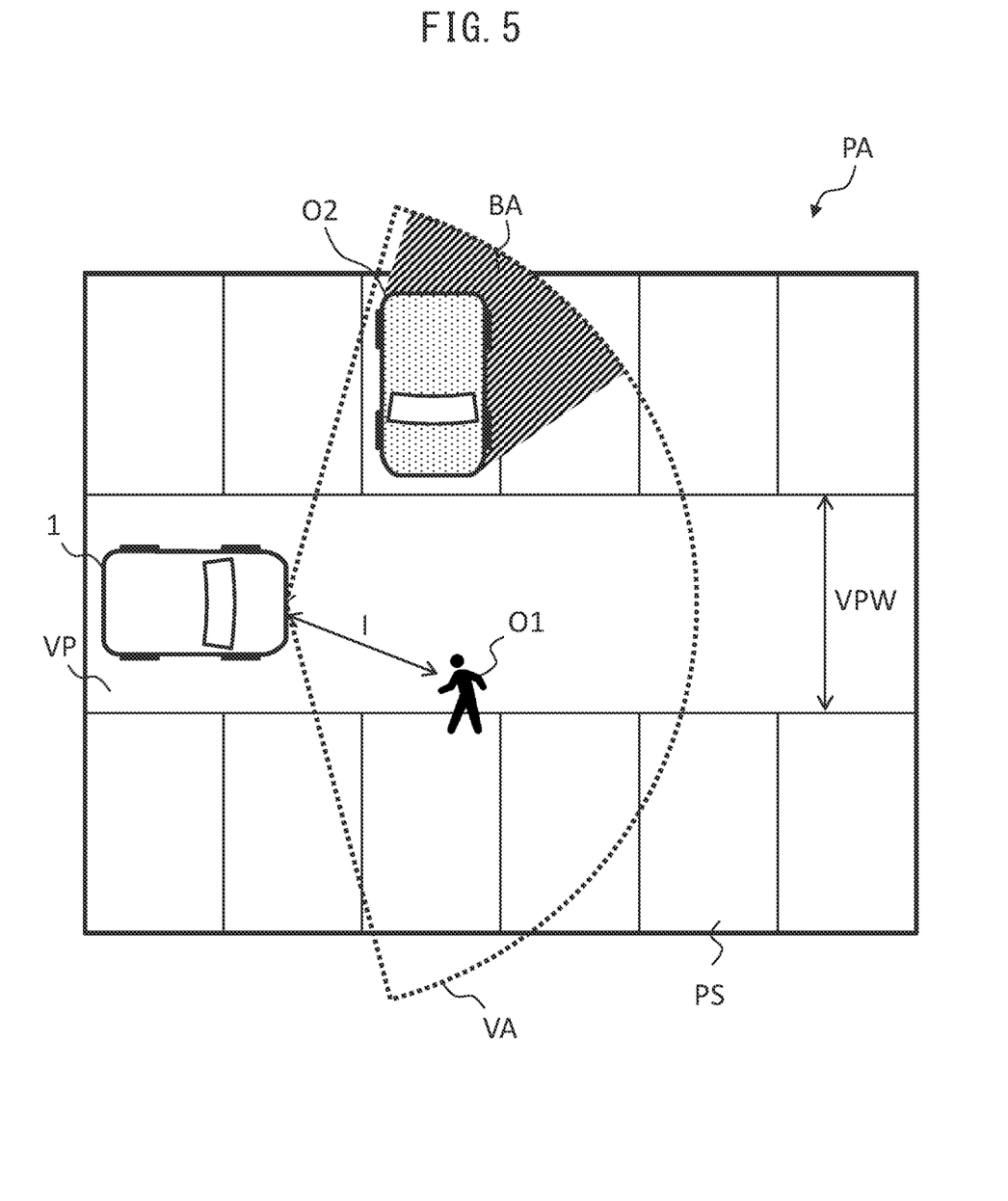
FIG. 5 is a schematic diagram for explaining an example of estimation of avoidance difficulty.

FIG. 5 is a schematic diagram for explaining an example of estimation of avoidance difficulty. FIG. 5 illustrates the vehicle 1 traveling on a vehicle path VP in a parking area PA including parking spaces PS bordering on the vehicle path VP.

The vehicle path width VPW in FIG. 5 is the width of the vehicle path VP. As the vehicle path width VPW is smaller, the time until a collision between an object approaching the vehicle 1 from outside the vehicle path VP and the vehicle 1 is shorter, which makes it more difficult to avoid a collision with the object by the collision avoidance control.

The estimation unit 533 identifies the vehicle path width VPW, based on parking area information included in control information received from the control device 102, and substitutes the identified vehicle path width VPW into a relation representing the relationship between vehicle path width and avoidance difficulty (path width relation), which is set so that the avoidance difficulty is greater as the vehicle path is narrower, thereby estimating avoidance difficulty. The estimation unit 533 may identify the interval between a pair of vehicle path boundaries detected from environmental data outputted from the environmental camera 2 as the vehicle path width VPW.

The control device 102 may include, in control information, the avoidance difficulty calculated by substituting the identified vehicle path width VPW based on the parking area information into the path width relation, and transmit the control information to the vehicle 1. In this case, the estimation unit 533 determines the avoidance difficulty included in the control information as estimated avoidance difficulty.

The interval I in FIG. 5 is the distance from the vehicle 1 to an object O1 (e.g., a pedestrian, another vehicle, or a sidewalk). As the interval I is shorter, the time until a collision between the object O1 and the vehicle 1 is shorter, which makes it more difficult to avoid a collision with the object by the collision avoidance control.

The estimation unit 533 identifies the interval I, based on object information included in control information received from the control device 102, and substitutes the identified interval I into a relation representing the relationship between an interval and avoidance difficulty (interval relation), which is set so that the avoidance difficulty is greater as the interval is shorter, thereby estimating avoidance difficulty. The estimation unit 533 may identify that distance from the vehicle 1 to the object O1 which is determined with the type of the object detected from environmental data outputted from the environmental camera 2, the size of the region representing the object, and a standard size of the object stored in the memory 52, as the interval I.

The interval I may be a predicted time until a collision between the vehicle 1 and the object O1. The estimation unit 533 predicts the time required for the collision from the positions, the moving directions, and the moving speeds of the vehicle 1 and the object O1.

The control device 102 may include, in control information, the avoidance difficulty calculated by substituting the identified interval I based on the object information into the interval relation, and transmit the control information to the vehicle 1. In this case, the estimation unit 533 determines the avoidance difficulty included in the control information as estimated avoidance difficulty.

The detection area VA in FIG. 5 is an area around the vehicle 1 corresponding to environmental data outputted by the environmental camera 2 at the current position of the vehicle 1. In the example of FIG. 5, an object O2 (e.g., a vehicle) is detected in the detection area VA. In the detection area VA, an area behind the object O2 is covered by the object O2 and is not represented in the environmental data. Thus, of the detection area VA, the area behind the object O2 with respect to the vehicle 1 is a blind spot BA. Regarding an object in the blind spot BA, collision avoidance control executed by the travel control unit 531 cannot be based on environmental data and is based on control information. Thus, as the ratio of the blind spot BA to the detection area VA is higher, the ratio of cases where collision avoidance control based on environmental data is not executable is higher, which makes it more difficult to avoid a collision with the object by the collision avoidance control.

The estimation unit 533 identifies the directions from the environmental camera 2 to the left and right edges of the area representing the object O2, and determines a subregion farther from the environmental camera 2 than the object O2 in the region sandwiched between the identified directions as the blind spot BA. The estimation unit 533 substitutes the sizes of the detection area VA and the blind spot BA into a relation representing the relationship between the ratio of a blind spot and avoidance difficulty (blind-spot ratio relation), which is set so that the avoidance difficulty increases with the ratio of the blind spot, thereby estimating avoidance difficulty.

As the distance from the vehicle 1 to the blind spot BA is shorter, the time until a collision between an object approaching the vehicle 1 from the blind spot BA and the vehicle 1 is shorter, which makes it more difficult to avoid a collision with the object by the collision avoidance control.

The estimation unit 533 may substitute the distance from the vehicle 1 to the blind spot BA into a relation representing the relationship between the distance to a blind spot and avoidance difficulty (blind-spot distance relation), which is set so that the avoidance difficulty is greater as the distance to the blind spot is shorter, thereby estimating avoidance difficulty.

The control device 102 may include, in control information, the avoidance difficulty calculated by substituting the identified ratio of the blind spot BA based on parking area information and the position of the vehicle 1 detected from facility data into the blind-spot ratio relation or by substituting the distance to the blind spot BA into the blind-spot distance relation, and transmit the control information to the vehicle 1. In this case, the estimation unit 533 determines the avoidance difficulty included in the control information as estimated avoidance difficulty.

Referring back to FIG. 4, the threshold setting unit 534 sets the delay threshold to a first threshold and stores the delay threshold in the memory 52 when the estimated avoidance difficulty is less than a difficulty threshold stored in the memory. When the estimated avoidance difficulty is greater than the difficulty threshold stored in the memory, the threshold setting unit 534 sets the delay threshold to a second threshold less than the first threshold and stores the delay threshold in the memory 52.

The travel controller 5 can regulate the speed of the vehicle 1 even when a small delay occurs in communication with the control device 102, using a smaller delay threshold when the avoidance difficulty is greater than the difficulty threshold than when the avoidance difficulty is less than the difficulty threshold. Thus the travel controller 5 can execute collision avoidance control reliably in the parking area PA managed by the automated valet parking system 100, and control travel of the vehicle 1 appropriately.

Figure 6:
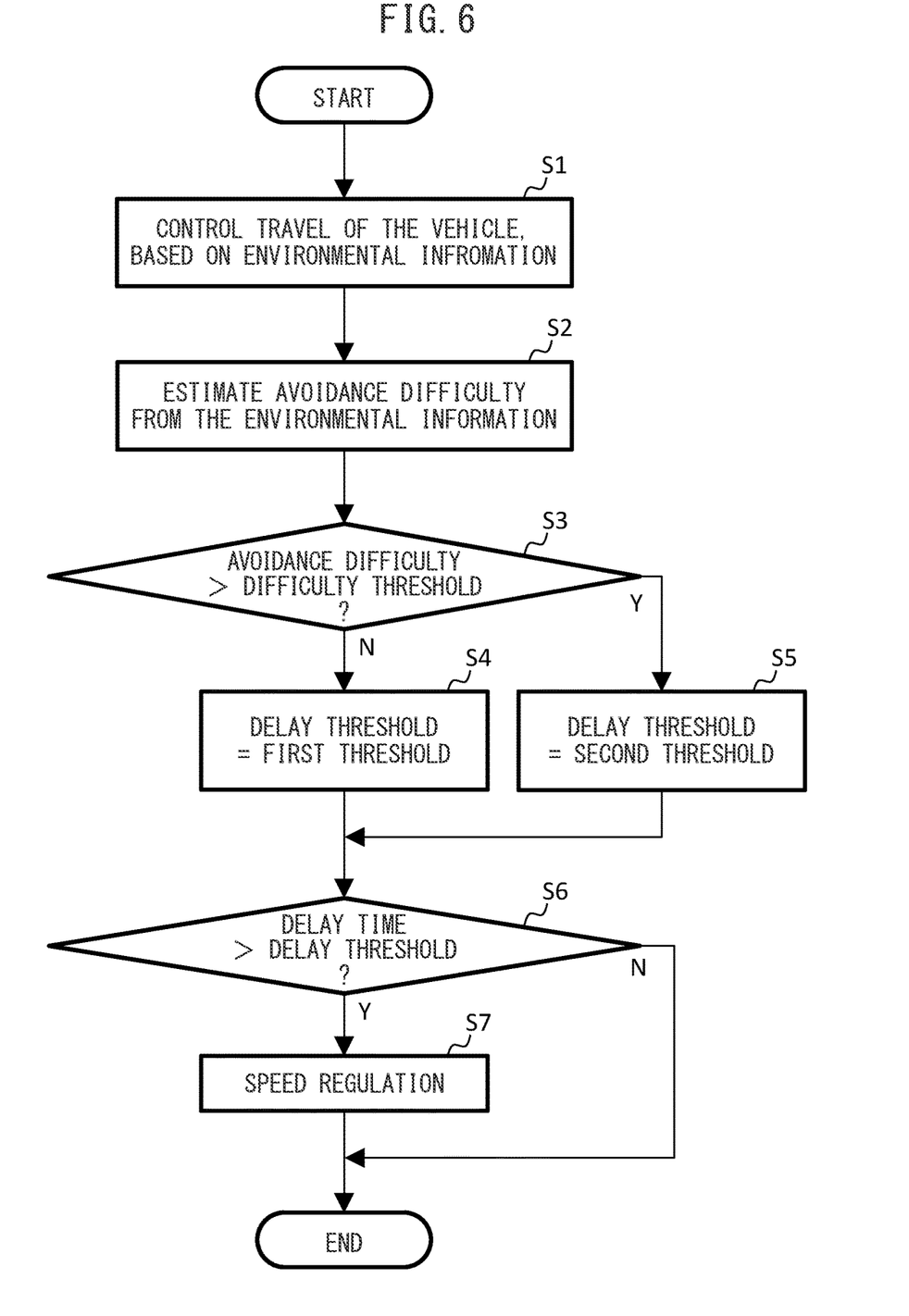
FIG. 6 is a flowchart of a travel control process.

FIG. 6 is a flowchart of the travel control process. During travel control of the vehicle 1 based on environmental information including control information transmitted from the control device 102, the processor 53 of the travel controller 5 executes the travel control process described below at predetermined intervals (e.g., at intervals of 1/10 seconds).

First, the travel control unit 531 of the processor 53 of the travel controller 5 executes travel control of the vehicle 1, which includes collision avoidance control for avoiding a collision of the vehicle 1 with an object in the vicinity of the vehicle 1, based on environmental information (step S1). The environmental information includes control information received from the control device 102 via the communication network NW and indicating conditions around the vehicle 1, and environmental data outputted from the environmental camera 2 and indicating conditions around the vehicle 1.

From the environmental information, the estimation unit 533 of the processor 53 estimates avoidance difficulty indicating the degree of difficulty in avoiding a collision by the collision avoidance control for the case where the object is detected in the conditions around the vehicle indicated by the environmental information (step S2).

Next, the threshold setting unit 534 of the processor 53 determines whether the estimated avoidance difficulty is greater than a difficulty threshold (step S3). When it is determined that the estimated difficulty threshold is not greater than the difficulty threshold (No in step S3), the threshold setting unit 534 sets the delay threshold to a first threshold (step S4). When it is determined that the estimated difficulty threshold is greater than the difficulty threshold (Yes in step S3), the threshold setting unit 534 sets the delay threshold to a second threshold less than the first threshold (step S5).

Subsequently, the speed regulation unit 532 of the processor 53 determines whether a delay time in receiving the control information exceeds a delay threshold (step S6). When the delay time in receiving the control information exceeds the delay threshold (Yes in step S6), the speed regulation unit 532 regulates the speed of the vehicle 1 (step S7) and terminates the travel control process. The speed regulation unit 532 can regulate the speed of the vehicle 1 by decelerating the vehicle 1 or changing the upper-limit speed of the vehicle 1 from a first speed to a second speed less than the first speed. When the delay time in receiving the control information does not exceed the delay threshold (No in step S6), the speed regulation unit 532 terminates the travel control process without regulating the speed of the vehicle 1. The speed of the vehicle 1 regulated in step S7 will be used in travel control in step S1 of the subsequent travel control process.

Execution of the travel control process enables the travel controller 5 to appropriately control travel of the vehicle 1 in the parking area PA managed by the automated valet parking system 100.

An example in which the travel controller 5 controls travel of a vehicle to be parked in a parking space PS has been described in the present embodiment, but the embodiment of the travel controller 5 according to the present disclosure is not limited to this example. For example, the travel controller 5 may be configured to control travel of a vehicle that transports a vehicle to be parked in a parking space PS.

Note that those skilled in the art can make various changes, substitutions, and modifications without departing from the spirit and scope of the present disclosure.

What is claimed is:

1. A travel controller comprising a processor configured to:
   execute travel control of a vehicle, based on environmental information, wherein the environmental information includes control information received from a control device via a communication network and environmental data outputted from an environmental sensor mounted on the vehicle, the control information and the environmental data indicate conditions around the vehicle, and the travel control includes collision avoidance control for avoiding a collision of the vehicle with an object in a vicinity of the vehicle;
   decelerate the vehicle or change an upper-limit speed of the vehicle from a first speed to a second speed less than the first speed when a delay time in receiving the control information exceeds a delay threshold;
   estimate, from the environmental information, avoidance difficulty indicating a degree of difficulty in avoiding a collision with the object by the collision avoidance control for a case where the object is detected in the conditions around the vehicle indicated by the environmental information; and
   set the delay threshold to a first threshold when the estimated avoidance difficulty is less than a difficulty threshold; and set the delay threshold to a second threshold less than the first threshold when the estimated avoidance difficulty is greater than the difficulty threshold.

2. The travel controller according to claim 1, wherein in the estimation, the processor estimates the avoidance difficulty at a greater degree as a vehicle path where the vehicle exists is narrower.

3. The travel controller according to claim 2, wherein in the estimation, the processor identifies a width of the vehicle path, based on information indicating a width of the vehicle path included in the control information of the environmental information.

4. The travel controller according to claim 1, wherein in the estimation, the processor estimates the avoidance difficulty at a greater degree as a distance to an object in the vicinity of the vehicle is shorter.

5. The travel controller according to claim 4, wherein in the estimation, the processor identifies the distance to the object in the vicinity of the vehicle, based on information indicating a position of the object included in the control information of the environmental information.

6. The travel controller according to claim 1, wherein in the estimation, the processor estimates the avoidance difficulty at a greater degree as a ratio of a blind spot that is not represented in the environmental data at a current position of the vehicle to an area around the vehicle corresponding to the environmental data is higher.

7. The travel controller according to claim 1, wherein in the estimation, the processor estimates the avoidance difficulty at a greater degree as a distance to a blind spot that is not represented in the environmental data at a current position of the vehicle in an area around the vehicle corresponding to the environmental data is shorter.

8. A method for travel control having a travel controller that controls travel of a vehicle execute a process comprising:
   executing travel control of the vehicle, based on environmental information, wherein the environmental information includes control information received from a control device via a communication network and environmental data outputted from an environmental sensor mounted on the vehicle, the control information and the environmental data indicate conditions around the vehicle, and the travel control includes collision avoidance control for avoiding a collision of the vehicle with an object in a vicinity of the vehicle;
   decelerating the vehicle or changing an upper-limit speed of the vehicle from a first speed to a second speed less than the first speed when a delay time in receiving the control information exceeds a delay threshold;
   estimating, from the environmental information, avoidance difficulty indicating a degree of difficulty in avoiding a collision by the collision avoidance control for a case where the object is detected in the conditions around the vehicle indicated by the environmental information; and
   setting the delay threshold to a first threshold when the estimated avoidance difficulty is less than a difficulty threshold; and setting the delay threshold to a second threshold less than the first threshold when the avoidance difficulty is greater than the difficulty threshold.

9. A non-transitory computer-readable medium storing a computer program for travel control, the computer program causing a computer mounted on a vehicle to execute a process comprising:
- executing travel control of the vehicle, based on environmental information, wherein the environmental information includes control information received from a control device via a communication network and environmental data outputted from an environmental sensor mounted on the vehicle, the control information and the environmental data indicate conditions around the vehicle, and the travel control includes collision avoidance control for avoiding a collision of the vehicle with an object in a vicinity of the vehicle;
- decelerating the vehicle or changing an upper-limit speed of the vehicle from a first speed to a second speed less than the first speed when a delay time in receiving the control information exceeds a delay threshold;
- estimating, from the environmental information, avoidance difficulty indicating a degree of difficulty in avoiding a collision by the collision avoidance control for a case where the object is detected in the conditions around the vehicle indicated by the environmental information; and
- setting the delay threshold to a first threshold when the estimated avoidance difficulty is less than a difficulty threshold; and setting the delay threshold to a second threshold less than the first threshold when the avoidance difficulty is greater than the difficulty threshold.

* * * * *